United States Patent Office 2,921,917
Patented Jan. 19, 1960

2,921,917
POWDERY STABILIZER COMPOSITIONS FOR VINYL CHLORIDE RESINS, AND METHOD OF PREPARATION

Stanley H. Longman, Little Silver, N.J., assignor to Carlisle Chemical Works, Inc., Reading, Ohio No Drawing. Application January 18, 1957
Serial No. 634,806

3 Claims. (Cl. 260—23)

The invention relates to a method of incorporating liquid stabilizers into halogen-containing resins, particularly resins containing homopolymers or copolymers of vinyl chloride.

Such stabilizers are used in rather small amounts to prevent or retard the decomposition and discoloration of halogen-containing resins under the prolonged action of heat or light. It has been customary to mix such stabilizers with the liquid plasticizers, which have been used in relatively large amounts, and in this way a homogeneous resin-plasticizer-stabilizer blend was readily obtained.

In recent years, the trend has been to reduce the amount of plasticizers added to the resin, particularly in the manufacture of rigid vinyl compositions, where the addition of plasticizer is undesirable because it lowers the heat distortion point of the finished articles; also, certain plasticizers and other solvents, though they are compatible with the resin, impart thereto an unpleasant smell or exert during processing an excessive lubricating action, and can, therefore, be applied in small amounts only.

Any such reduction in the amount of liquid carrier, be it a plasticizer or other compound, has raised the problem of obtaining a uniform distribution of the stabilizer in the resin, and this problem has not yet been satisfactorily solved. If a liquid stabilizer is blended with a vinyl chloride resin, the stabilizer coats the resin particles and forms a pasty mass which is difficult to handle. If the stabilizer is sprayed on the resin during the drying process, it is almost impossible to obtain an even distribution.

According to the invention, a resin powder is mixed with an amount of liquid stabilizer, which is much larger than the amount required for stabilization, and the mixture is then heated for a short time to a temperature approximately corresponding to the softening point of the resin, preferably about 175–200° F. I have found that under these conditions the stabilizer penetrates into the resin particles and that when the resin is cooled, a free flowing dry powder is produced which contains the stabilizer absorbed by the resin. Such free flowing powder may contain the stabilizer in the proportion of about 20 to 45 percent by weight of the mixture. It can be prepared in any standard mixing device, such as steam-jacketed ribbon or dough mixers, and the like.

The thus obtained powdery blend of resin with about 20 to 45 percent of liquid stabilizer presents said stabilizer in a form in which it can be readily and homogeneously incorporated in resins in the desired very small amounts which are in most cases less than 5, preferably about .5 to 3 percent by weight of the finished resin product. The resin-stabilizer composition may be added to the resin during processing; preferably, it is mixed with the resin powder, whereby other conventional fillers, coloring agents, lubricating agents and the like may be added, and the mixture can be directly used for extrusion or injection molding.

Liquid stabilizers suitable for the method of the invention are particularly organo-tin and organic antimony compounds, and also other liquid stabilizers, such as metal soaps of calcium, barium, strontium, cadmium, zinc, lead, tin, and other metals, or mixtures thereof, with fatty acids having 6–18 carbon atoms in a linear or preferably branched chain; acids used in stabilizers are, for instance 2 ethyl butyric acid, 2 ethyl hexoic acid, isooctoic acid, isodecanoic acid, isododecanoic acid, and similar acids obtained, for example, through the oxo reaction, by oxidation of the aldehydes obtained from the olefines to the corresponding carboxylic acids. Also liquid auxiliary stabilizers, which have a synergistic effect in combination with the recited primary stabilizers, may be converted in the same way into dry powdery resin blends, by absorbing them alone or in mixture with the primary stabilizer in a resin carrier by means of the heat treatment set forth hereinabove. Examples of such auxiliary stabilizers are, for instance, epoxy compounds, organic phosphites, substituted phenols, sulfur compounds, and others.

The resin used for taking up the stabilizer is preferably substantially the same as the resin to be stabilized. Such resins are particularly polyvinyl chloride, and copolymers of vinyl chloride with other polymerizable compounds having an olefinic double bond. But other halogen-containing resins, such as polymers and copolymers of vinylidene chloride, may be stabilized in this way, as well as used as carrier for the stabilizer.

The following examples are given to illustrate the invention.

Example 1

Into a steam-jacketed stainless steel double ribbon mixer are charged 400 pounds of vinyl chloride resin powder, for example, Geon 103EP of the B. F. Goodrich Company. After the resin has been charged, 148 pounds of a liquid polymeric dibutyl tin di-methoxide as prepared according to Example 1 of Patent No. 2,626,953, are added to the powder. The agitator is started and low pressure steam is turned on. The heating is continued until the temperature reaches 180–190° F. then the mixture is held at this temperature for 15 to 25 minutes and cooled immediately to room temperature by running cold water into the jacket. A powdery product is obtained which contains about 27 percent of the originally liquid stabilizer and has a tin content of 10%. 30 g. of said product and 5 g. of powdered stearic acid are added to 1,000 g. of Geon resin 103EP and blended together by tumbling in a mixing drum. The obtained blend is fed directly in a single screw extruder and a clear rigid tube is extruded.

Example 2

In a similar manner, as set forth in Example 1, 400 lbs. of a vinyl chloride vinyl acetate copolymer containing about 95% vinyl chloride and about 5% vinyl acetate, and 200 lbs. of dibutyl tin monomethoxy methylmaleate prepared according to Example 4 of Patent No. 2,684,973, were treated at 175–180° F. A free flowing powder was obtained, containing 10% tin. Thirty parts of this stabilizer and 600 parts of the vinyl chloride-vinyl acetate resin, together with 10 parts of a synthetic powdered wax N,N' ethylene bis stearamide were blended together and the powder charged in an injection molding machine. Clear and colorless caps were injection molded directly from the blend.

Example 3

To 200 lbs. of a vinyl chloride-vinylidene chloride copolymer (15:85), 50 lbs. of dibutyl tin di (propyleneglycol maleate), prepared by reacting propyleneglycol maleate halfester with dibutyl tin oxide, were added and the mixture was heated to 190° F. as described in Example 1. A free flowing powder was obtained containing 4% tin metal.

*Example 4*

In the same manner as in the preceding examples, the following stabilizer resin blends were further prepared:

(a) 200 lbs. of vinyl chloride resin and 100 lbs. of dibutyl tin di (2-ethylhexyl aceto-mercaptide). The resulting dry powder contained 6% tin.

(b) 200 lbs. of vinyl chloride resin and 100 lbs. of dibutyl tin laurate-maleate. The resulting dry powder contained 6% tin.

(c) 200 lbs. of vinyl chloride resin and 100 lbs. of a liquid polymer of the stabilizer employed in Example 4a. The resulting dry powder contained 6.6% tin.

*Example 5*

300 lbs. of polyvinyl chloride resin and 100 lbs. of lead 2 ethyl hexoate containing 40% of lead were charged in a steel jacketed double ribbon mixer as outlined in Example 1, treated in the same way at 190° F. for 30 minutes and then cooled rapidly to room temperature. A free flowing powder containing 10% of lead was obtained.

In an identical manner, vinyl chloride resins containing barium metal was prepared by blending 300 lbs. of vinyl chloride resin and 100 lbs. of the barium salt of a C-11, C-12 synthetic branched chain fatty acid prepared through the oxo process from a mixture of C-10, C-11 olefines. The metal content of the barium soap, which at 60° F. was a viscous liquid, was 26%. The barium content of the finished product, which constituted a free-flowing powder, was 6.5%.

*Example 6*

100 g. of the cadmium salt of a mixed branched chain fatty acid consisting of C-9 and C-10 fatty acids as obtained through the oxo process from a mixture of C-8 and C-9 olefines were prepared by fusion of the fatty acid with cadmium oxide. The metal content was 30%. The soap was at 170° F. a viscous liquid and was added in molten state to a pre-warmed batch of 300 g. of vinyl chloride resin at 185° F. The mixture was stirred vigorously in a Dormeyer mixer, warmed in a double jacketed container to 190° F. for about 20 minutes and then cooled to room temperature. The resulting resin was a fine free flowing powder containing 7.5% of cadmium.

In an identical manner, a vinyl resin containing zinc 2 ethyl hexoate was prepared from a zinc 2 ethyl hexoate containing 17.85% Zn by mixing 300 g. of vinyl chloride resin and 100 g. of the zinc compound in the manner described above. The zinc content of the free flowing resin powder was about 4%.

I claim:

1. A method of stabilizing halogen-containing resins with a liquid stabilizer in an amount of about .5 to 5 percent by weight of said resin, said method comprising first mixing a powdery halogen-containing resin consisting of at least 65 percent of units of a member of the group consisting of vinyl chloride and vinylidene chloride, the balance being essentially units of an unsaturated compound copolymerizable therewith, with about 25 to 60 percent by weight of a stabilizer which is liquid at room temperature and selected from the group consisting of organotin compounds, organic antimony compounds, and soaps of a metal selected from the group consisting of alkaline earth metals, cadmium, zinc, lead, and tin, with an aliphatic carboxylic acid containing more than 6 carbon atoms, heating said mixture to a temperature of about 175 to 200° F., cooling said mixture, thereby obtaining a free flowing resin powder rich in stabilizer, and adding said powder to additional amounts of said halogen-containing resin in such a proportion that the final blend contains about .5 to 5 percent of the stabilizer.

2. A method of preparing a stabilizer composition for halogen-containing resins comprising mixing a powdery halogen-containing resin consisting of at least 65 percent of units of a member of the group consisting of vinyl chloride and vinylidene chloride, the balance being essentially units of an unsaturated compound copolymerizable therewith, with about 25 to 60 percent by weight of a stabilizer which is liquid at room temperature and selected from the group consisting of organotin compounds, organic antimony compounds, and soaps of a metal selected from the group consisting of alkaline earth metals, cadmium, zinc, lead, and tin, with an aliphatic carboxylic acid containing more than 6 carbon atoms, heating said mixture to about 175 to 200° F., and cooling said mixture, thereby converting said liquid stabilizer into a free flowing powdery stabilizer composition.

3. As a powdery free-flowing stabilizer composition for homogeneous distribution of liquid stabilizers in halogen-containing resins, the product obtained by the process claimed in claim 2.

References Cited in the file of this patent

UNITED STATES PATENTS

| | | |
|---|---|---|
| 2,056,796 | Macht et al. | Oct. 6, 1936 |
| 2,456,216 | Richter | Dec. 14, 1948 |
| 2,478,862 | Cox et al. | Aug. 9, 1949 |
| 2,581,360 | Costa et al. | Jan. 8, 1952 |

FOREIGN PATENTS

| | | |
|---|---|---|
| 580,729 | Great Britain | Sept. 18, 1946 |

OTHER REFERENCES

Lally et al.: Stabilization of Polyvinyl Chloride, pp. 111-4, Modern Plastics (December 1949). (Copy in Sci. Lib.)

Greenspan et al.: Epoxy Fatty Acid Ester Plasticizers, I. & E. Chem., pp. 2722-6, vol. 45, No. 12 (December 1953). (Copy in Sci. Lib.)